United States Patent Office 3,011,971
Patented Dec. 5, 1961

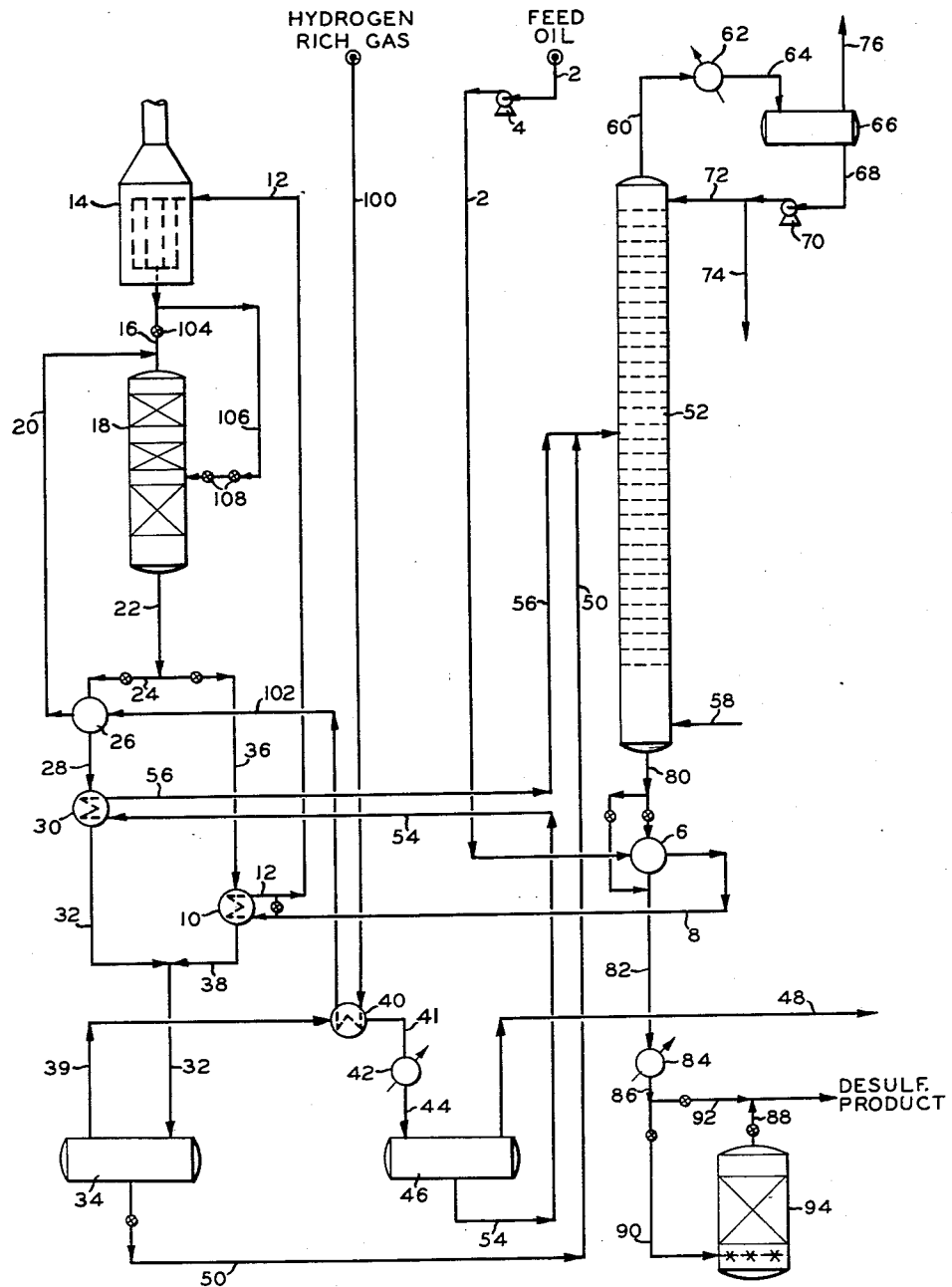

3,011,971
HYDRODESULFURIZING DISSIMILAR HYDROCARBONS
Charles E. Slyngstad and Frank L. Lempert, Rutherford, N.J., assignors to The M. W. Kellogg Company, Jersey City, N.J., a corporation of Delaware
Filed Sept. 5, 1958, Ser. No. 759,284
11 Claims. (Cl. 208—210)

This invention relates to an improved method and means for contacting a chemical compound in the presence of a hydrogen-containing gas under desired conversion conditions. In one aspect the invention is directed to the method and means for converting dissimilar hydrocarbons in the presence of hydrogen-containing gas under desired conditions. More specifically, the invention is directed to the method of desulfurizing dissimilar hydrocarbon feed materials in the presence of hydrogen-rich gases in an apparatus which provides optimum simplicity, versatility and efficiency of operation.

The present invention has wide application for systems or processes in which various hydrocarbon materials are reacted in the presence of hydrogen-containing gases. Moreover, this invention is of particular importance for the improvement of desulfurization processes by virtue of the optimum versatility encompassed in the design for processing dissimilar hydrocarbon feed materials with efficient utilization of hydrogen-rich gases employed therein. In desulfurizing processes it is preferred to maintain a high ratio of hydrogen to sulfur-containing hydrocarbon since high hydrogen partial pressure in the reaction zone has a favorable influence on the efficiency of desulfurization, the life of the catalyst and the amount of carbon produced and deposited on the catalyst in the reaction. Furthermore, dissimilar hydrocarbon feed materials varying in sulfur content, such as straight run or cracked products of reaction, require desulfurization, in many instances, prior to further use or conversion. Moreover, such hydrocarbons require in some instances different severity of treatment to obtain the desired degree of desulfurization. By means of this invention, dissimilar hydrocarbon feed materials are efficiently desulfurized by a method and means of optimum versatility.

It is an object of this invention to provide a novel method and means of contacting a chemical compound with a hydrogen-containing gas to obtain a high degree of utilization of hydrogen.

Another object of this invention is to provide a method for converting dissimilar hydrocarbons in a single conversion zone in the presence of hydrogen-rich gases.

Still another object of this invention is to provide a desulfurization process of optimum versatility for processing sulfur-containing hydrocarbons.

Other objects and advantages of this invention will become apparent from the following description and explanation thereof.

The invention is practiced by providing a reaction zone containing a plurality of catalyst beds wherein a hydrogen-rich gas is passed sequentially through the catalyst beds in a reaction zone, a first hydrocarbon feed material is passed sequentially through said catalyst beds with said hydrogen-rich gas under desulfurizing conditions, a desulfurized product of said first hydrocarbon feed is recovered from the reaction zone, the first hydrocarbon reactant stream passed to the reaction zone is discontinued while the hydrogen-rich stream is continuously passed through the catalyst beds in the reaction zone, a second hydrocarbon reactant different from the first hydrocarbon reactant is introduced to the reaction zone for flow through only a portion of the catalyst in the reaction zone while the hydrogen-rich gas is continuously passed through the total mass of catalyst in the reaction zone whereby the second hydrocarbon feed is passed through only the desired portion of catalyst of the reaction zone and a desulfurized second hydrocarbon feed is recovered from the reaction zone.

This invention contemplates a system which involves contacting a chemical compound with hydrogen under a wide variety of reaction conditions of space velocity, temperature and pressure conditions such as superatmospheric and/or subatmospheric temperature and/or pressures. In any of these applications it may be desirable, although not necessary, to maintain a specified ratio of hydrogen to chemical compound. By means of the present invention the desired ratio of hydrogen to chemical compound can be maintained at a relatively high value to the total amount of hydrogen and chemical compound which is charged to the process. In essence, this embodiment of the invention is accomplished by passing a chemical compound of the reactant in parallel flow through at least two separate reaction or contacting zones with the hydrogen-containing gas being passed serially through said contacting zones.

This invention has application to operation involving the conversion of a hydrocarbon in the presence of a hydrogen-containing gas such as for example, aromatization, hydrogenation, reforming, hydroforming, isomerization, cracking under hydrogen pressure, desulfurization, etc. Among the various processes which can utilize the method of the present invention to a particular advantage is found in the desulfurization of dissimilar hydrocarbon materials. Dissimilar hydrocarbons are intended to include those of the same or different boiling range having a different API gravity or such hydrocarbons referred to as straight run hydrocarbons and hydrocarbon fractions obtained from catalytic reactions such as cracking. While it is true that certain desulfurization processes such as for example, autofining, are operated under conditions to effect a net production of hydrogen, nevertheless our invention can be used for any desulfurization system involving multi-reactors and employing hydrogen. This is especially true in the case of those desulfurization reactions in which a net consumption of hydrogen is obtained. Generally, for these kinds of systems or processes it is desired to maintain a high ratio of hydrogen to hydrocarbon and since the cost of manufacturing hydrogen is high, the incentive to improve the process in the direction of effecting efficient desulfurization by using lower ratios of hydrogen to hydrocarbon is exemplified by providing a process of maximum versatility for processing dissimilar sulfur-containing hydrocarbons under optimum conversion or desulfurizing conditions. Accordingly, the present invention is of special utility for desulfurizing dissimilar hydrocarbon feeds and effecting desulfurization proceses in which a net consumption of hydrogen is effected and wherein it is desirable to maintain a high ratio of hydrogen to hydrocarbon in producing desulfurization.

In practicing the process of the present invention the chemical compound to be contacted with the hydrogen may be maintained in either a liquid, vapor or mixed liquid-vapor state under contacting or conversion conditions. In the case wherein a hydrocarbon is converted in the presence of a hydrogen-containing gas, the temperature of treatment may be varied from about 350° F. to about 1250° F., at a pressure of from about 1 atmosphere to about 4000 p.s.i.g., a weight space velocity of about .01 to about 25 measured as the pounds of hydrocarbon charged to the conversion zone per pound of catalyst present therein.

The catalyst to be used for the purpose of converting the hydrocarbon may be of any of those well-known in the prior art, such as for example, siliceous catalysts including silica-alumina, platinum-alumina type catalysts used in reforming or hydroforming, or desulfurization reactions may be conducted in the presence of chromia, molybdenum-trioxide, nickel-molybdate supported on alumina, or nickel-tungstate-alumina or cobalt-molybdate catalysts.

The desulfurization reactions effected in accordance with the present invention may employ temperatures in the range of from about 550° F. to about 1000° F., preferably from about 600° F. to about 800° F., a pressure of from about 25 to about 2000 p.s.i.g., preferably from about 300 to about 1000 p.s.i.g., a weight space velocity of about .05 to about 20, preferably from about 0.5 to about 10. The hydrogen which is charged to the system may be from about 300 to about 20,000 standard cubic feet of hydrogen per barrel of oil feed.

The catalytic material may be any suitable desulfurization catalyst including those which are hydrogenation catalysts such that the sulfur impurities are either absorbed by the catalyst and/or hydrogenated to produce hydrogen sulfide, which is evolved as a product of the process. Other catalysts which also may be used for this purpose are for example, platinum and/or palladium supported on alumina type catalysts, a group VI metal compound including for example the oxide and/or sulfide of the left hand elements thereof, specifically chromia and/or molybdenum trioxide supported on alumina; the group VI metal compound can be promoted with a compound of a metal of group VIII having an atomic number not greater than 28, such as for example the oxides and/or sulfides of iron, cobalt and nickel. Another suitable class of catalysts are the heteropoly acids which have molybdenum, chromium, vanadium, and/or tungstic as the outer acid-forming element and phosphorous, silicon, germanium, platinum, etc., can be present as the central acid-forming element. Examples of the heteropoly acids are phosphomolybdic acid, phosphotungstic acid, either alone or supported on a carrier material, such as for example silica-alumina.

The hydrocarbons to be desulfurized by means of the present invention include those referred to as straight run hydrocarbons or hydrocarbon products of cracking operations which include gasoline, naphtha, kerosene, gas oil, cycle stocks from catalytic cracking or thermal cracking operations, residual oils, thermal and coker distillates, etc. This also includes those special cuts of either straight run or catalytically cracked products which are referred to as cycle oil, stove oil, diesel fuels, etc. The sulfur concentration of these hydrocarbon stocks may vary from about .03 to about 10 percent by weight. It is also contemplated treating hydrocarbon stocks having a gravity of from about 20 to about 50 API, and a sulfur concentration of from about 0.25 to about 6.0 percent by weight, such as for example, gas oil and light catalytically cracked cycle stock. However, it should be understood that other feed stocks or any combinations thereof may be processed in accordance with this invention. It is also contemplated that the boiling range of the hydrocarbon feed to the desulfurization process contemplated by this invention may vary from about 70 to about 800° F., and the end point may vary from about 250 to about 1050° F. at atmospheric pressure.

Since the desulfurization-hydrogenation reaction produces a small volume of naphtha as a by-product, the volume of the treated gas oil is somewhat less than that of the fuel oil. If the treated oil is to have a minimum sulfur content on a weight percent basis equal to one-tenth of that in the feed oil, the actual sulfur removal must be slightly greater than about 90 percent. In the case of a light cycle oil feed, this removal amounts to about 92 weight percent of the sulfur in the charge stock. In order to accomplish the above, the following specific process conditions are employed:

| | |
|---|---|
| Reactor inlet temperature ° F. | 700–750 |
| Reactor space velocity w./hr./w. | 3.2 |
| Reactor pressure p.s.i.g. | 900 |
| Recycle gas rate (excluding make-up gas) s.c.f.b. | 1200 |
| Reactor flow direction | Downwards |

As previously mentioned herein, the conditions under which the hydrogen-containing gas is contacted with the chemical compound include maintaining the chemical compound in a liquid, vapor or mixed liquid-vapor state. Further, while maintaining the chemical compound or hydrocarbon in the liquid state, the contact with the hydrogen-containing gas may be effected under either concurrent or countercurrent conditions.

It is also contemplated within the scope of this invention of employing a multi-reactor system or a plurality of reactors suitably connected in order that the chemical compound or hydrocarbon to be treated in each reactor may be the same or of different composition. That is, the hydrocarbon or hydrocarbons to be treated are passed in parallel flow arrangement through the reactors, whereas the hydrogen-rich gas flows serially through the plurality of reactors employed. Accordingly then, there may be at least two reactors or more in the process and the number may be as high as desired, depending upon the hydrocarbons to be treated, economics of the process, hydrogen available and desired ratio of hydrogen to chemical compound in a reactor. This, of course, is of material importance, particularly in a process in which hydrogen is consumed. The amount of the chemical compound or hydrocarbon passed to each reactor may be the same or it may be varied in relatively large quantities or a different chemical compound may be passed to each reactor with the hydrogen-rich gas passed serially through the reactors. This, of course, depends upon the particular feed material to be treated and results desired, the only restriction being in that the clean or least contaminated hydrocarbon should be contacted first with the hydrogen-rich gas.

By means of the present invention, the process will operate with equal efficiency on any one or combination of the feed materials described herein. Table I below describes particular feed materials which may be successfully desulfurized by the process of this invention. Furthermore, hydrogen-containing gases, of varying impurity, such as those obtained from a reforming process, may be successfully employed herein. Table II below gives the composition of two different hydrogen-rich gas streams which may be successfully employed in the process of this invention. Of course, it is to be understood that other hydrogen-rich gas streams of different composition may also be successfully employed in the present invention.

TABLE I

*Charge stocks*

| | Stove Oil | Diesel Base | FCC Light Cycle Oil |
|---|---|---|---|
| Gravity, °API | 42.0 | 34.0 | 27.0 |
| Color, ASTM | 25 | 16 | |
| Flash, °F | 125–150 | 140–200 | 140–200 |
| Sulfur, Wt. percent | 0.8 | 1.5 | 2.0 |
| ASTM Distillation, °F.: | | | |
| IBP | 360 | 374 | 350 |
| 10% | 390 | 520 | 405 |
| 50% | 440 | 570 | 482 |
| 90% | 510 | 600 | 588 |
| FBP | 540 | 620 | 615 |

TABLE II

*Feed gas compositions*

| Mol Percent | Average Purity | Maximum Purity |
|---|---|---|
| $H_2$ | 84.9 | 93.7 |
| $C_1$ | 3.1 | 1.0 |
| $C_2$ | 2.1 | 0.7 |
| $H_2S$ | .8 | 0.8 |
| $C_3$ | 1.9 | 0.8 |
| $C_4$ | 4.8 | 2.0 |
| $C_5$ | 1.2 | 0.5 |
| $C_6+$ | 1.2 | 0.5 |
| Total | 100.0 | 100.0 |

In accordance with one embodiment of the present invention, the reactor is provided with a plurality of separate fixed catalyst beds within the reactor shell containing substantially equal quantities of catalyst in each bed amounting to from about 10 percent to about 20 percent of the total mass of catalyst within the reactor. By this arrangement, the particular feed to be treated may be passed in contact with any desired quantity or portion of the catalyst within the reactor under selected reaction conditions. In another embodiment, the reactor contains at least three catalyst beds with the two upper catalyst beds containing approximately equal quantities of catalyst in each bed and the lowermost bed containing a quantity of catalyst at least equal to the total quantity of catalyst in the remaining catalyst beds.

It is also contemplated within the scope of this invention to employ a plurality of separate catalyst beds in the reactor with each bed containing a different quantity of catalyst. In this embodiment, generally, the quantity of catalyst in each catalyst bed will increase in the direction of flow of reactant material. The catalyst beds are retained as fixed catalyst beds between suitable perforated grids or foraminous members which will permit flow of reactant materials and/or chemical compounds sequentially through the catalyst beds in the reactor shell. Provisions are made for introducing feed material to any portion of the catalyst beds in the reactor, as well as means for introducing a suitable quench material, such as a gas or oil, which may be a recycle gas or oil between the catalyst beds, to effect a means of temperature control of the reaction within desired limits. As previously stated, provisions are made for introducing a desired hydrocarbon reactant material between any one of the catalyst beds for flow of the hydrocarbon reactant through a portion of the catalyst within the reactor chamber as desired while the hydrogen-rich gas is passed continuously and sequentially through the total mass of catalyst or catalyst beds within the reactor chamber. By this arrangement, a hydrocarbon reactant or chemical compound may be processed at any multiple of the space velocity amounting to from about 1 to about 10 times the space velocity for the total catalyst inventory under desired temperature and pressure conditions. Furthermore, by this arrangement, dissimilar reactant materials may be contacted under varying severity conditions of operation. Moreover, this arrangement lends itself to a system of optimum flexibility and versatility for processing dissimilar hydrocarbon reactants, particularly for the desulfurization of sulfur-containing hydrocarbons. More specifically, a reactant material comprising a fluid catalytic cracking light cycle oil having a low API gravity of about 27 API or a diesel base feed material having an API gravity of about 34 may be desulfurized at a space velocity below about 3.4 w./hr./w. to remove at least about 90 percent of its sulfur content by passing the cycle oil with the hydrogen through the total mass of catalyst in the reactor. In addition, a reactant or feed material of higher API gravity of about 42.0 API, such as a stove oil, may be effectively desulfurized without color change by passing the material in contact with only a desired portion of the catalyst mass, say about one half or less than half of the total catalyst mass in the presence of hydrogen while the hydrogen-rich stream is passed through the total catalyst mass. Accordingly, the space velocity will be increased at least twice that employed when using the total quantity of catalyst in the reactor. In this latter arrangement, the passage of the hydrogen-rich gas through the total mass of catalyst in the reactor prevents or excludes the passage of vapors from the higher API gravity material from entering into the remaining portion of the catalyst in the reactor. When treating a higher API gravity material in this manner, an advantage is achieved during the desulfurization of the feed material in that the process may be carried out at much higher space velocity conditions above about 6.0 w./hr./w., such that there is no degradation of the feed color. Accordingly, the space velocity may be controlled over a wide range as hereinbefore indicated by introducing the feed or reactant material at various points of the total mass of catalyst within the reactor in order that the hydrocarbon feed passes through only the desired portion of the catalyst mass, while the hydrogen-rich stream passes through the total mass of catalyst in the reactors.

One of the primary advantages in the process design of this invention resides in the design of the reactor effluent heat exchange system to provide efficient utilization of available heat with consequent savings in utility expenses while at the same time using a minimum of costly alloy steel, such as stainless steel surfaces. Optimum use of alloy surface in the reactor effluent heat exchange train or system has been achieved by splitting the effluent at the reactor outlet and using one branch to heat feed oil in heat exchanger 10, while using the other branch or portion of the stream to heat recycle gas in heat exchanger 26 and provide stripper preheat in heat exchanger 30. The stripper preheat is controlled by regulating the quantity of effluent passed through each stream. If the necessary effluent split results in too low a temperature, for example, in separate drum 34, feed oil may then bypass the cold side of heat exchanger 10 until the desired drum temperature is obtained. However, should the separator drum 34 temperature become too high, a quantity of the stripper bottoms may be bypassed around heat exchanger 6, thus forcing the feed oil to absorb more heat in heat exchanger 10 and consequently lowering the temperature in separator drum 34. Additional surface has also been provided in cooler 84 to provide for adequate final cooling of the stripper bottoms regardless of the heat absorbed in exchanger 6. Furthermore, sufficient surface is included in the heat exchange system in order that the reactor outlet temperature may be varied from a minimum of about 650° F. to about 800° F.

An additional advantage resides in the process of this invention in that the recycle gas is heated to from about 570° F. to about 600° F., by heat exchange with the reactor effluent, thereby reducing the need to further heat this stream in a separate furnace. This, therefore, eliminates the requirement for protecting furnace tubes against hydrogen sulfide and hydrogen whereby the tubes may be formed from a less expensive material with consequent savings in investment.

In addition to the above, a particular advantage resides in the combination of a multi-temperature flash drum system in cooperation with a low pressure steam stripper. For example, the two drum reactor effluent flash system 34 and 46 provides the greater part of the stripper feed at an elevated temperature of about 450° F. and utilizes a small amount of a 125° F. stream to absorb a slight amount of additional preheat required for the efficient operation and control of the stripper tower. This system, therefore, precludes any necessity for cooling the entire reactor effluent to a low level of about 125° F. and thus expensive and inefficient reheating of the entire tower feed is eliminated.

The steam stripper operated at an average temperature within the range of from about 300° F. to about 600° F. and a pressure of about atmospheric to 100 p.s.i.g. provides a means for removing hydrogen sulfide from the treated hydrocarbon and at the same time permits control of the ASTM initial boiling point of this product. By using steam as the stripping medium in the lower portion of the tower the use of expensive alloy reboilers is also eliminated. Furthermore, the lower temperature inherent in the steam stripper also substantially eliminates the problem of degrading product color by excessive reheating.

Referring now to the drawing, by way of example, a cycle oil feed obtained from a catalytic cracking operation and having an API gravity of about 27.0 is supplied by means of conduit 2 at a rate of about 8000 b.p.s.d. The cycle oil contains about 2 percent by weight of sulfur and it is desired by the process of this invention to reduce the sulfur concentration at least 90 percent. The cycle oil feed is passed by conduit 2 containing pump 4 to heat exchanger 6 at a temperature of about 60° F. and is passed in indirect heat exchange with products of reaction more fully described hereinafter, whereby the temperature of the feed is raised to about 257° F. Thereafter the feed is passed by conduit 8 to a second indirect heat exchanger 10 for indirect heat exchange with a portion of the reaction effluent stream to further elevate the temperature of the cycle oil feed to about 660° F. The cycle oil feed at this elevated temperature is then passed by conduit 12 to a furnace 14 wherein the cycle oil is further heated to a temperature of from about 740° F. to about 800° F., depending upon the reactor outlet temperature desired. The thus heated cycle oil leaves furnace 14 by conduit 16 for introduction into the reaction zone 18. Hydrogen-rich gas which has been heated by indirect heat exchange means, as herein described, to an elevated temperature of about 600° F. is admixed with the cycle oil feed to be desulfurized prior to entering the reaction zone. In this particular embodiment, the hydrogen-rich gases at an elevated temperature of about 600° F. are passed by conduit 20 for admixture with cycle oil in conduit 16 to provide a mixture having a temperature of about 750° F., and thereafter the mixture is passed to the reactor 18 to be passed in contact with the mass of catalyst therein. In this specific embodiment the reactor is provided with three separate catalyst beds in which the two upper beds have equal portions of catalyst therein and the lowermost bed has a quantity of catalyst at least equal to the total amount of catalyst in the upper two catalyst beds. The mixture of cycle oil and hydrogen is passed through the reactor in contact with granular cobalt-molybdate catalyst supported on aluminum. This catalyst comprises approximately 2.5 percent by weight of cobalt oxide and about 14.0 percent by weight of molybdenum oxide. The hydrogenation of the sulfur compounds to produce hydrogen sulfide, as well as hydrogenation of some of the hydrocarbon constituents, involves both endothermic and exothermic reactions; consequently, depending upon the degree of hydrogenation there may be a temperature rise within the reactor 18 due to exothermic reaction. In order to control reaction temperature, provisions are made for introducing a quench oil between catalyst beds such as between the first and second or uppermost catalyst beds. The desulfurized product and entrained hydrogen-rich stream are removed from the bottom of the reactor 18 by conduit 22 at a temperature of about 800° F. The product effluent stream comprising desulfurized hydrocarbon, hydrogen-rich gas, as well as hydrogen sulfide formed during the desulfurization reaction, is then split into two streams such that a portion of the product effluent stream is passed by conduit 24 to heat exchanger 26, to reduce the temperature of the stream to about 630° F. This stream will comprise a vapor and liquid stream in which the vapor will amount to about 17,610 pounds per hour, whereas the liquid stream will amount to about 1046 b.p.s.d. and will have an API gravity of about 29.7. This stream is then passed by conduit 28 to heat exchanger 30 for additional heat removal, and thereafter the stream is passed by conduit 32 to separation drum 34. The remaining portion of the product effluent stream is passed by conduit 36 to heat exchanger 10 and conduit 38 for admixture with the product effluent stream passed by conduit 32 to separation drum 34. Separation drum 34 is maintained at a pressure of about 867 p.s.i.g. and a temperature of about 450° F. In separation drum 34 a gaseous stream comprising about 59.2 mol percent hydrogen and 18.8 mol percent hydrogen sulfide and amounting to about 33,097 pounds per hour is withdrawn by conduit 39 and passed to heat exchanger 40 wherein the temperature of the stream is reduced to about 332° F. This stream is then passed by conduit 41 to a cooler 32 and then by conduit 44 to separation drum 46 maintained at a pressure of about 850 p.s.i.g. and a temperature of about 125° F. In separation drum 46 a vaporous stream amounting to about 12,461 pounds per hour and comprising 68 mol percent hydrogen and 19.4 mol percent hydrogen sulfide is withdrawn by conduit 48 and passed to a suitable treating step not shown for the separation of hydrogen sulfide from a hydrogen-rich stream, which then may be reused in the process. In separation drum 34, a liquid stream amounting to about 6770 b.p.s.d. and having an API gravity of about 30.4 is withdrawn by conduit 50 and passed to a steam stripping tower 52. A liquid stream is also withdrawn from separating drum 46 which amounts to about 1670 b.p.s.d. having an API gravity of about 35.1 is withdrawn by conduit 54 and passed to heat exchanger 30 wherein the temperature of the stream is elevated to about 405° F. Thereafter this stream at an elevated temperature is passed by conduit 56 for admixture with the liquid product effluent in conduit 50 and passed to the steam stripper 52. The combined streams at a temperature of about 435° F., from conduits 56 and 50 contain vaporous material amounting to about 4900 pounds per hour and liquid material amounting to about 7980 b.p.s.d. having an API gravity of about 29.9. The combined stream is then passed to the steam stripping tower for separation of a desulfurized product stream from the remaining portion of the product effluent stream. In steam stripper 52, steam at a temperature of about 450° F. and a pressure of about 175 p.s.i.g. is introduced at a rate of about 4050 pounds per hour to the bottom of the column by conduit 58. In the steam stripping tower 52, unstabilized gasoline and gaseous material is stripped from the desulfurized product, removed from the top of the tower by conduit 60 at a temperature of about 277° F. This stream contains about 4050 pounds per hour of steam and hydrocarbons amounting to about 24,765 pounds per hour. This stream is passed by conduit 60 to a cooler 62 and then passed by conduit 64 to separating drum 66 maintained at a temperature of about 90° F., and a pressure of about 15 p.s.i.g. In separating drum 66, unstabilized gasoline product is separated from a gaseous product and removed therefrom by conduit 68 containing pump 70. This liquid stream is then split such that a portion of the stream amounting to about 1465 b.p.s.d. is passed by conduit 72 as reflux to the tower. The remaining portion of the stream amounting to about 319 b.p.s.d. or about 3737 pounds per hour and having an API gravity of about 44.4 is withdrawn by conduit 74 for further treatment. The gaseous product is withdrawn from separation drum 66 by conduit 76 and may be passed to suitable recovery equipment, not shown, to obtain a hydrogen-rich gaseous stream for further use in the process. Referring back to the stripper, the stripped desulfurized product is withdrawn from the bottom of the stripping tower by conduit 80 at a temperature of about 360° F. and passed to heat exchanger 6 wherein the temperature is reduced to about 250° F., by being passed in indirect heat exchange with feed material. Provisions are also made by bypassing heat exchanger 6 with desulfurized product withdrawn from the bottom of the stripper. Thereafter the desulfurized product is passed by conduit 82 to cooler 84 to reduce the temperature to about 100° F. and the cooled desulfurized product may then be passed by conduit 86 containing pump 88 to a suitable salt drier 94 by conduit 90 or the desulfurized product may bypass the salt drier and be withdrawn as product of the process by conduit 92. Referring now back to the hydrogen feed stream, fresh hydrogen-rich gas containing about 85 mol percent hydrogen and about 1.9 mol percent hydrogen sulfide at a rate of about 3080 pounds per hour is admixed with hydrogen rich recycle gas to provide a hydrogen stream comprising about 72.3 percent hydrogen. This stream, amounting to about 15,295 lb./hr. is passed by conduit 100 at a temperature of about 150° F. and a pressure of about 1010 p.s.i.g. to heat exchanger 40 wherein the temperature of the hydrogen-rich gas is raised to a temperature of about 400° F. by being passed in indirect heat exchange with the vaporous material in conduit 36 recovered from product effluent separating drum 34. The thus heated hydrogen-rich gas is then passed by conduit 102 to indirect heat exchanger 26 wherein the temperature of the stream is further elevated to a temperature of about 600° F. by being passed in indirect heat exchange with product effluent in conduit 24. The thus heated hydrogen-rich gas is then passed by conduit 20 to reactor 18 as hereinbefore discussed.

When processing a hydrocarbon feed material such as a stove oil, for example, under desulfurizing conditions without degradation of color, the stove oil having an API of about 42.0 is passed through only about one half of the total mass of catalyst in the reactor. By closing valve 104 and passing the stove oil feed through conduit 106 containing valve 108, the stove oil is introduced to the reactor between the middle and bottom catalyst beds. In this embodiment the hydogen-rich gases introduced by conduit 20 are continuously passed downwardly through the upper catalyst beds in the reactor to be admixed with the hydrocarbon introduced by conduit 106 and passed through the lower catalyst bed under desulfurizing conditions. By this method of operation, the hydrogen-rich gases continuously pass through the total catalyst mass keeping it clear of hydrocarbon vapors, as well as effecting a partial regeneration of the upper catalyst beds simultaneously with desulfurization of the feed in the lower portion of the reactor. In addition, this prevents the upper catalyst beds from being contaminated with vapors of the stove oil feed. The products of reaction are then removed from the bottom of the reactor by conduit 22 as hereinbefore described.

Table II below presents the results obtained when treating an FCC light cycle oil feed described in Table I in accordance with this invention.

Table IV below presents the results obtained when treating a stove oil described in Table I in accordance with this invention.

TABLE III

*Material balances*

MATERIAL BALANCE
FCC LIGHT CYCLE OIL FEED

|  | Feed | | Gas | Products | |
|---|---|---|---|---|---|
|  | Cycle Oil | Feed Gas | | Gasoline | Prod. Oil |
| Vol. percent on Feed | 100.0 |  |  | 5.0 | 95.0 |
| B.p.s.d | 8,000 |  |  | 400 | 7,590 |
| ° API | 27.0 |  |  | 37.8 | 28.5 |
| lb./gal | 7.43 |  |  | 6.96 | 7.36 |
| G.p.h | 14,000 |  |  | 700 | 13,260 |
| lb./hr | 104,000 | 3,080 | 4,594 | 4,877 | 97,609 |
| Sulfur, Wt. Percent | 2.0 |  |  | .02 |  |
| Sulfur, lb./hr | 2,080 |  | 1,921 | 1 | 153 |
| S.c.f.b |  |  | 400 | 168 |  |

TABLE IV

*Material balance stove oil feed*

|  | Feed | | Gas | Products | |
|---|---|---|---|---|---|
|  | Stove Oil | Feed Gas | | Gasoline | Prod. Oil |
| Vol. Percent on Feed | 100.0 |  |  | 3.0 | 96.9 |
| B.p.s.d | 8,000 |  |  | 258 | 7,750 |
| ° API | 42.0 |  |  | 50.0 | 43.0 |
| lb./gal | 6.79 |  |  | 6.49 | 6.75 |
| G.p.h | 14,000 |  |  | 451 | 13,550 |
| lb./hr | 95,000 | 1,289 | 1,836 | 2,927 | 91,506 |
| Sulfur, Wt. Percent | 0.8 |  |  | .02 | .07 |
| Sulfur, lb./hr | 760 |  | 698 | 1 | 61 |
| S.c.f.b |  | 165 | 90 |  |  |

Having thus described our invention and presented specific working examples thereof, it is to be understood that various modifications may be made thereto without departing from the scope thereof.

We claim:
1. A method for upgrading dissimilar hydrocarbon feed materials of different API gravity which comprises passing a hydrogen-rich gaseous stream sequentially through a reaction zone containing a plurality of separate catalyst beds, passing one of said hydrocarbon feed materials comprising a low API gravity material obtained from a cracking operation admixed with said hydrogen through said catalyst beds in said reaction zone under reaction conditions to upgrade said hydrocarbon feed material to desired product, recovering product of said low API gravity feed, discontinuing the flow of said low API gravity feed material to said reaction zone, continuing the flow of said hydrogen-rich stream to said reaction zone, introducing a straight run hydrocarbon feed material of higher API gravity than said first-mentioned feed material to said reaction zone at a point such that the latter feed material passes through only a portion of said catalyst beds admixed wtih hydrogen under reaction conditions while the hydrogen-rich stream passes through the remaining portion of said catalyst beds, and recovering a product of said high API gravity feed from said reaction zone.

2. A method for desulfurizing hydrocarbon feed materials in a reaction zone containing a plurality of separate catalyst beds which comprises passing a hydrogen-rich stream sequentially through a reaction zone containing a plurality of separate catalyst beds, passing a low API gravity hydrocarbon feed material admixed with said hydrogen passed to said reaction zone and treating said mixture under desulfurizing conditions sequentially in said catalyst beds in said reaction zone to convert said low API gravity feed material to a desired product, discontinuing the flow of said low API gravity feed material passed to said reaction zone while continuing the flow of hydrogen thereto, introducing a second hydrocarbon feed material of higher API gravity than said low API gravity feed to said reaction zone such that the high API gravity feed is admixed with hydrogen and passes through only the last of said plurality of catalyst beds under desulfurization conditions while the hydrogen-rich stream is continuously passed sequentially through all of said catalyst beds.

3. A method for desulfurizing hydrocarbons which comprises passing a hydrogen-rich stream sequentially through a plurality of separate catalyst beds confined within a reaction zone, passing a cycle oil sequentially through said plurality of catalyst beds admixed with said hydrogen-rich stream under desulfurizing conditions, recovering desulfurized cycle oil from said reaction zone, discontinuing the flow of cycle oil to said reaction zone, introducing a stove oil to said reaction zone such that the stove oil passes through only a portion of said catalyst in such reaction zone admixed with said hydrogen-rich stream under desulfurizing conditions while the hydrogen-rich stream passes sequentially through said plurality of catalyst beds and recovering desulfurized stove oil from said reaction zone.

4. A method for desulfurizing hydrocarbon feed materials which comprises passing a hydrogen-rich stream sequentially through a plurality of separate beds of catalyst, introducing a low API gravity feed material to the first of said catalyst beds for sequential flow through said catalyst beds with said hydrogen-rich stream under desulfurizing conditions, recovering desulfurized hydrocarbon of low API gravity, discontinuing the flow of said low API gravity feed to said catalyst beds, continuing the flow of said hydrogen-rich stream through said catalyst beds, introducing a high API gravity feed material to said hydrogen stream such that the high API gravity feed is desulfurized in the presence of said hydrogen-rich stream at a space velocity about twice that employed for said low API gravity feed and recovering a desulfurized product of said high gravity feed.

5. A method for upgrading dissimilar hydrocarbon feed materials in a reaction zone containing a plurality of separate catalyst beds, said reaction zone adapted for the control of reaction temperature therein, which comprises passing a hydrogen-rich gaseous stream sequentially through said catalyst beds in said reaction zone, introducing a cycle oil product of a catalytic cracking reaction as feed to said reaction zone for sequential flow therethrough with said hydrogen stream under reaction conditions to upgrade said cycle oil to desired product, recovering upgraded cycle oil product from said reaction zone, discontinuing the flow of cycle oil to said reaction zone, introducing a feed material having an API gravity above about 34 to said reaction zone while passing hydrogen-rich gas sequentially therethrough such that the latter feed material is passed in contact with only sufficient catalyst to upgrade said latter feed material to a desired product without substantial change in color thereof and recovering product of said latter feed material from said reaction zone.

6. A method for desulfurizing hydrocarbons which comprises passing a hydrogen-rich gaseous stream through a reaction zone containing a plurality of separate catalyst beds under desulfurizing conditions, passing a first hydrocarbon feed material having an API gravity below about 34.0 with said hydrogen sequentially through said plurality of catalyst beds under desulfurizing conditions such that at least about 90 percent of the sulfur contained in said first hydrocarbon feed is removed, recovering a desulfurized product of said first hydrocarbon feed, discontinuing the flow of said first hydrocarbon feed to said reaction zone, continuing the flow of said hydrogen-rich gaseous stream sequentially through said plurality of catalyst beds, introducing a second hydrocarbon feed material having an API gravity above about 34.0 to said reaction zone such that the second hydrocarbon feed is desulfurized at a space velocity at least about twice the space velocity employed for said first hydrocarbon feed, and recovering a desulfurized product of said second hydrocarbon feed.

7. A method for treating hydrocarbon feed materials of different API gravity in a reaction zone which comprises providing a plurality of separate catalyst beds in a reaction zone, passing a hydrogen-rich stream sequentially through said catalyst beds in said reaction zone, passing a low API gravity hydrocarbon feed material with said hydrogen-rich stream sequentially through said catalyst beds in said reaction zone under reaction conditions including a space velocity below about 3.5 w./hr./w. to convert said feed to desired product, recovering product of said low API gravity feed, discontinuing flow of said low API gravity feed to said reaction zone, continuing the flow of hydrogen-rich stream through said catalyst beds, passing a hydrocarbon feed material having a higher API gravity than said low API gravity feed through said reaction zone in the presence of hydrogen such that said feed of higher API gravity contacts only a portion of said catalyst in said reaction zone under reaction conditions including a space velocity above about 6.0 w./hr./w. to convert said high API gravity feed to desired products and recovering product of said high API gravity feed.

8. A method for treating hydrocarbon feed materials under desulfurizing conditions in an elongated reaction zone containing a plurality of separate catalyst beds therein which comprises passing a hydrogen-rich gaseous stream downwardly through a plurality of catalyst beds in a reaction zone, passing a first hydrocarbon reactant with said hydrogen-rich stream in contact with said catalyst under desulfurizing conditions, recovering a desulfurized product from the bottom of said reaction zone, discontinuing passage of said first hydrocarbon reactant to said reaction zone, introducing a second hydrocarbon reactant different from said first hydrocarbon reactant into said reaction zone for downward flow through a portion of the catalyst therein in the presence of hydrogen under desulfurizing conditions, continuing the flow of hydrogen-rich gas sequentially through the catalyst beds in said reaction zone whereby the second hydrocarbon feed is excluded from the catalyst beds above the point of introduction of said second hydrocarbon feed and recovering a desulfurized product of said second hydrocarbon feed from the bottom of said reaction zone.

9. A method for desulfurizing dissimilar hydrocarbon feed materials in the presence of a desulfurization catalyst which comprises providing an elongated reaction zone containing a plurality of separate catalyst beds, passing a hydrogen-rich gaseous stream sequentially through said catalyst beds in said reaction zone, passing a first hydrocarbon feed material through said catalyst in said reaction zone with said hydrogen-rich stream under desulfurizing conidtions to produce a desulfurized product, recovering desulfurized product of said first hydrocarbon feed material from said reaction zone, discontinuing passage of said first hydrocarbon feed to said reaction zone, continuing the passage of hydrogen-rich gas through said reaction zone, introducing a second hydrocarbon reactant of higher API gravity than said first hydrocarbon reactant to an intermediate portion of said reaction zone for flow with hydrogen-rich gas through a portion of the catalyst in the reaction zone under desulfurizing conditions whereby the second hydrocarbon feed material is prevented from coming in contact with the remaining portion of catalyst in the reaction zone by the flow of hydrogen therethrough and recovering a desulfurized product of said second hydrocarbon feed from said reaction zone.

10. A method for desulfurizing hydrocarbons of different API gravity which comprises providing a plurality of separate catalyst beds in an elongated reaction zone, passing a hydrogen-rich gas sequentially through said catalyst beds, passing a first low API gravity hydrocarbon feed with said hydrogen-rich gas through said catalyst beds under desulfurizing conditions, recovering desulfurized product from said reaction zone, discontinuing introduction of said first hydrocarbon feed while continuing the flow of hydrogen through said catalyst beds in said reaction zone, separately introducing a second hydrocarbon feed material of higher API gravity than said first hydrocarbon feed to said reaction zone such that the second hydrocarbon feed is passed in contact with at least about half of said catalyst in said reaction zone under desulfurizing conditions while continuing the flow of catalyst through the total mass of catalyst in the reaction zone and recovering desulfurized product of said second hydrocarbon feed from said reaction zone.

11. A method for desulfurizing hydrocarbons which comprises providing a reaction zone containing at least three separate fixed beds of catalytic material wherein the mass of catalyst in the bottom fixed bed is at least equal to the mass of catalyst in the remaining catalyst beds in the reaction zone, passing a hydrogen-rich gaseous stream downwardly through said reaction zone, passing a first sulfur-containing hydrocarbon reactant stream obtained from a catalytic cracking operation downwardly through said reaction zone with said hydrogen-rich stream under desulfurizing conditions, recovering a desulfurized hydrocarbon stream from said reaction zone, discontinuing the passage of said first hydrocarbon stream to said reaction zone while continuing the passage of hydrogen-rich gas through the catalyst beds in said reaction zone, introducing a second sulfur-containing hydrocarbon reactant stream having an API gravity of at least about 30° API to said reaction zone such that said second hydrocarbon stream is passed through only the lowermost catalyst bed with said hydrogen-rich stream under desulfurizing conditions for recovering a desulfurized hydrocarbon product stream from the bottom of said reaction zone.

References Cited in the file of this patent

UNITED STATES PATENTS

| | | |
|---|---|---|
| 2,587,149 | Gwynn | Feb. 26, 1952 |
| 2,587,987 | Franklin | Mar. 4, 1952 |
| 2,723,946 | Donaldson | Nov. 15, 1955 |
| 2,724,683 | Nadro | Nov. 22, 1955 |
| 2,773,008 | Henstebeck | Dec. 4, 1956 |
| 2,833,698 | Patton et al. | May 6, 1958 |
| 2,901,417 | Cook et al. | Aug. 25, 1959 |

UNITED STATES PATENT OFFICE
CERTIFICATE OF CORRECTION

Patent No. 3,011,971 December 5, 1961

Charles E. Slyngstad et al.

It is hereby certified that error appears in the above numbered patent requiring correction and that the said Letters Patent should read as corrected below.

Column 3, line 13, after "or", second occurrence, insert -- cobalt-molybdate-alumina and nickel- --; column 5, line 32, for "ecah" read -- each --; column 6, line 39, for "separate" read -- separator --; column 8, line 17, for "32" read -- 42 --; column 9, line 38, for "hydogen-rich" read -- hydrogen-rich; line 53, for "II" read -- III --; same column 9, TABLE III, column 6, line 7 thereof, insert -- 0.2 --; column 10, line 39, for "wtih" read -- with --; line 73, for "such" read -- said --; column 12, line 34, for "conidtions" read -- conditions --.

Signed and sealed this 10th day of July 1962.

(SEAL)
Attest:
ERNEST W. SWIDER
Attesting Officer

DAVID L. LADD
Commissioner of Patents